Figure 1:
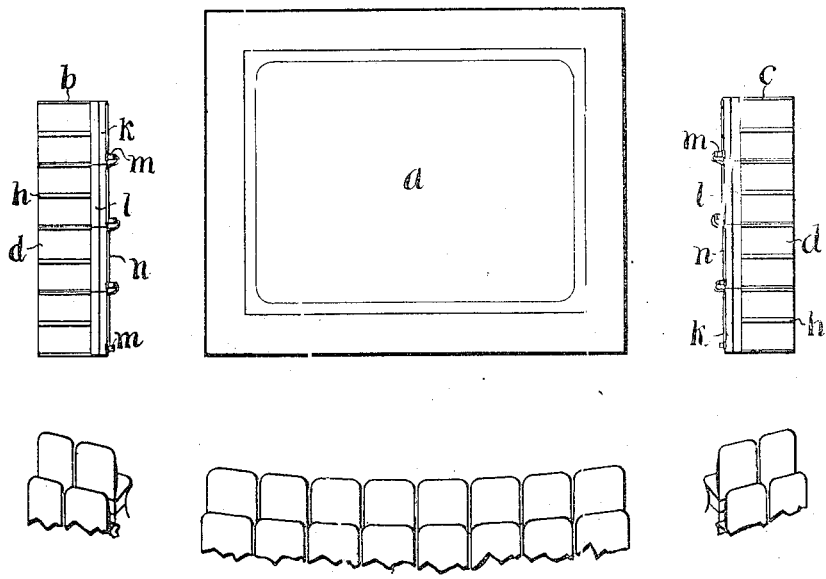

F. C. THOMAS.
DISPLAY APPARATUS.
APPLICATION FILED NOV. 1, 1915.

1,252,629.

Patented Jan. 8, 1918.

INVENTOR
Frank C. Thomas
BY
Emery, Booth, Janney & Varney
ATTORNEYS

UNITED STATES PATENT OFFICE.

FRANK C. THOMAS, OF NEW YORK, N. Y., ASSIGNOR, BY DIRECT AND MESNE ASSIGNMENTS, TO UNITED EXHIBITORS ADVERTISING CORPORATION, OF WILMINGTON, DELAWARE, A CORPORATION OF DELAWARE.

DISPLAY APPARATUS.

1,252,629.   Specification of Letters Patent.   Patented Jan. 8, 1918.

Application filed November 1, 1915. Serial No. 58,999.

*To all whom it may concern:*

Be it known that I, FRANK C. THOMAS, residing at 934 East 179th street, in the city, county, and State of New York, have invented an Improvement in Display Apparatus, of which the following description, in connection with the accompanying drawings, is a specification, like letters on the drawings representing like parts.

This invention relates to a means of advertising in theaters and particularly to a means of advertising in moving picture theaters, wherein the invention presents particular advantages in getting the advertising matter before the patrons of the theater in the least objectionable and most effective manner.

The problem of advertising in moving picture theaters has long commanded the attention of advertising men. The many elements which must be considered in devising such a means of advertising make the problem most complicated. Advertising must not be forced upon the audiences. The audience must not be tricked into reading advertising matter when expecting other things. Furthermore, advertising must be presented in such a way that it will not antagonize the audience nor unduly intrude upon or submerge the real purposes of the theater. If such is not the case, readers of advertising matter will not be encouraged to buy the advertised goods but, on the contrary, will shun the advertiser and the theater wherein the objectionable advertising methods are employed. It has been proposed to display advertising matter for a short period of time between different pictures or photo plays, upon the motion picture screen by means of a projection camera. Such advertising has not been found practicable either from the point of view of the advertiser or of the theater manager. Considered from the point of view of the former, the advertising "story" is upon the screen only for a few seconds, and is shown at a time when the audience has been previously gazing at the screen for a relatively long uninterrupted period and at the end of the picture, when the observer's eyes are naturally tired and he is eager to turn from the screen. Furthermore, interest in the recently finished photo play or the like, causes one naturally to resent the drawing of one's attention so abruptly to advertising matter. From the point of view of the theater manager this advertising upon the screen is highly objectionable because such methods readily lead to the feeling among patrons of the theater, that they are paying to witness a display of advertising matter upon the screen. Attendance at theaters following such a policy has been observed to fall off rapidly and the pecuniary return for the advertising does not compensate the manager for lost patrons.

With the foregoing facts in mind the present invention has been made and embodied in an apparatus which will give greatly improved results under the conditions that must be met. The present embodiment of the invention provides means for the continuous display of a comparatively large number of advertisements throughout the whole time when the theater is open and yet interferes in no way with the projection of the moving picture. Advertisements presented by means of the present invention are not forced upon the attention of the audience, the display of photo plays is not interrupted, the advertising "story" remains before the audience a sufficient length of time to be assimilated, the advertisements may be changed from day to day as may be desired, and yet the advertising is so positioned and illuminated that it is visible to every person of the audience.

Figure 2:
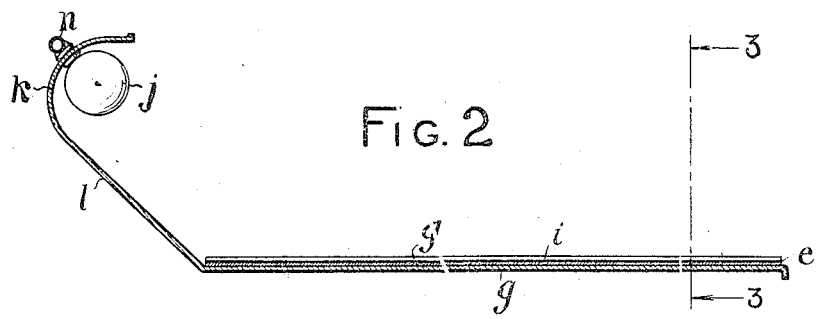
Figure 3:
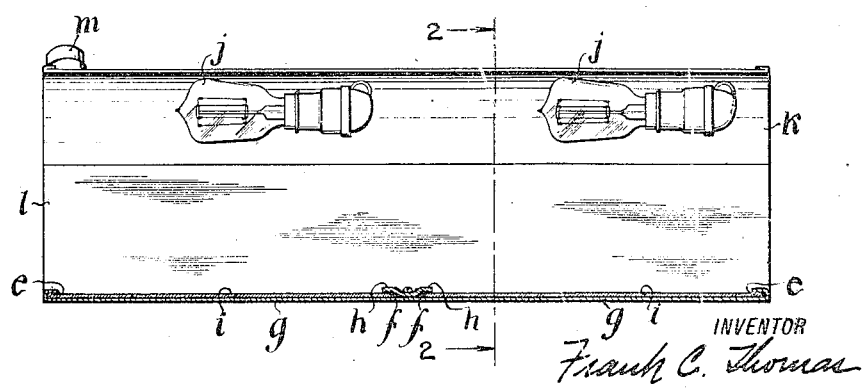

Referring to the particular embodiment of the invention herein selected for purposes of illustration, Figure 1 is a perspective showing an installation of the invention in a moving picture theater;

Fig. 2 is a horizontal section of one of the display racks on the line 2—2 of Fig. 3, and Fig. 3 is a cross section on the line 3—3 of Fig. 2.

The embodiment of the present invention shown in the drawings and presently to be described, provides a means for accomplishing the objects sought to be attained, whose use will prove the least objectionable and the most effective. It provides for a continuous illuminated display of advertising matter, held stationary before the audience, Its simplicity of structure will commend it because there are no complicated mechanical parts to get out of order, as in a great many display apparatus, and the display of advertising is so associated with the main screen that during a pause in the projection of pictures, or at intervals when the pictures being displayed upon the screen fail to interest anyone in the audience, the illuminated display cannot fail to attract the eye and lead practically every person in the audience to read the advertising matter some time during their stay in the theater.

Referring back to the drawings, and for the present particularly to Fig. 1, a screen $a$ is shown upon which the motion pictures are projected. Flanking the screen are two series, $b$ and $c$, of display racks $d$ arranged at a substantial, though not a great distance from the main screen $a$. The display racks $d$ may be of any convenient size and any convenient or feasible number may be arranged in each series. Each rack is adapted to hold a card which will carry the advertising matter and which can be readily inserted into and removed from the racks as occasion may demand. The seats of the theater are suggested in the foreground of Fig. 1.

It is essential that the advertising cards be illuminated in such a manner that the source of light will not be in the direct view of the audience, and the intensity of the light must be adjusted to a point where a sufficient though not a brilliant illumination of the cards is provided; otherwise the illumination would distract the attention of the audience which is fixed upon the main screen and would interfere with the view of the projected pictures. The association of the display racks with the main screen and their construction as shown in Figs. 2 and 3 provides for these essentials.

Referring to Figs. 2 and 3, a pair of display racks is there shown. The means for holding the advertising cards comprise the grooves $e$ and $f$, one formed by the upturned edges of the back portion $g$ and the other formed by a strip $h$ fast to the back $g$. A card $i$ is shown in position in Figs. 2 and 3. Means for holding an electric light bulb, as a source of light, are shown at the left and rear of Figs. 2 and 3 respectively. An incandescent lamp $j$ is mounted within a reflector $k$ which is adapted to concentrate the rays of light from the bulb upon the advertising card and at the same time to shield the bulb from the view of an observer directly in front of the display racks, and, in fact, from every observer within the theater. To better accomplish this purpose the bulb and reflector are preferably located slightly forward and to one side of the display rack between the adjusting card and the screen; and the connecting member $l$, formed if desired as a continuation of the body portion of the rack, is surfaced with some suitable light absorbing paint or other covering. For convenience the racks are here shown constructed in pairs, and the electrical connections are made through plugs $m$ located on every other rack and located at the end of conduits $n$ running along the back of the reflectors $k$. Suitable electrical connections are provided between the several lamps and from the lamps to a convenient source of electrical energy. On account of the normally darkened interior of the theater, incandescent bulbs of small candle power are preferably used. The construction of the display racks in units as shown permits the amount of display space in any theater to be easily and quickly adjusted to the needs of the advertisers.

From the foregoing description, it will be apparent that the herein described apparatus presents a well organized means for the presentation of advertising matter to the audiences of moving picture theaters, in that it places the advertisements permanently before the audience, associates the advertisement with the main screen in such a way that the eye of one observing the main screen is attracted at appropriate moments to read the advertisement and yet it is not forced upon the attention of the observer in an offensive manner. The display of pictures is not interrupted in any way and the advertisement, remaining permanently before the audience, allows an interested observer to look at the advertisement several times if interested and to thoroughly assimilate the idea that the advertiser is attempting to convey.

I claim as my invention:

1. Means for combining amusement and instruction comprising a room having a screen whereon pictures may be projected and means for displaying lighted advertising matter in said room simultaneously with the projection of pictures onto said screen, said advertising matter being displayed in sufficient proximity to said screen to enable the eyes of the observer to see both the pictures and the advertising matter without substantial change of the position of the eyes, and means to shield said pictures from the source of light used in displaying said advertising matter.

2. Means for combining amusement and instruction comprising a room having a screen whereon motion pictures may be projected, and means to display lighted advertising matter in said room simultaneously with the projection of said pictures and in sufficient proximity to said screen to enable the eyes of the observer to see both the motion pictures and the advertising matter without substantial change of position of the eyes, and means to shield said motion pictures from the source of light used in displaying said advertising matter.

3. Means for combining amusement and instruction comprising a room having a screen whereon pictures may be projected, means for displaying lighted advertising matter in said room simultaneously with the projection of pictures and in sufficient proximity to said screen to enable the eyes of the observer to see both the pictures and the advertising matter without substantial change of the position of the eyes, means to shield said pictures from the source of light used in displaying said advertising matter, and means to modulate the lighting of said advertising matter to harmonize with the partially darkened condition of the room during the projection of the pictures.

In testimony whereof, I have signed my name to this specification.

FRANK C. THOMAS.

Copies of this patent may be obtained for five cents each, by addressing the "Commissioner of Patents, Washington, D. C."